(12) United States Patent
Simpson et al.

(10) Patent No.: US 6,998,746 B2
(45) Date of Patent: Feb. 14, 2006

(54) ELECTRIC MOTOR SLEEVE BEARING ASSEMBLY WITH ACOUSTIC/VIBRATION DECOUPLING AND ENDPLAY ADJUSTMENT

(75) Inventors: Stan Simpson, St. Thomas (CA); Bryan Todd Fisher, Appin (CA); Eric Bartlett, London (CA); Dumitru Plavosin, London (CA)

(73) Assignee: Siemens VDO Automotive Inc., Chatham (CA)

( * ) Notice: Subject to any disclaimer, the term of this patent is extended or adjusted under 35 U.S.C. 154(b) by 0 days.

(21) Appl. No.: 10/866,367

(22) Filed: Jun. 10, 2004

(65) Prior Publication Data

US 2005/0017585 A1    Jan. 27, 2005

Related U.S. Application Data

(60) Provisional application No. 60/489,650, filed on Jul. 24, 2003.

(51) Int. Cl.
*H02K 7/06* (2006.01)
*H02K 5/16* (2006.01)
*H02K 7/10* (2006.01)
*H02K 7/08* (2006.01)

(52) U.S. Cl. ............................. 310/90; 310/51; 310/91
(58) Field of Classification Search .................. 310/51, 310/89, 91
See application file for complete search history.

(56) References Cited

U.S. PATENT DOCUMENTS

| | | | | |
|---|---|---|---|---|
| 3,300,971 A | * | 1/1967 | Qualman et al. | 60/341 |
| 3,363,950 A | * | 1/1968 | Cole | 384/220 |
| 3,889,141 A | * | 6/1975 | Merriam | 310/154.24 |
| 5,277,500 A | * | 1/1994 | Keck | 384/204 |
| 5,786,647 A | * | 7/1998 | Vollmer et al. | 310/89 |
| 5,945,756 A | * | 8/1999 | Periyathamby et al. | 310/89 |

* cited by examiner

Primary Examiner—Tran Nguyen

(57) ABSTRACT

An electric motor includes an armature structure 12 having a shaft 14, a lamination stack 11 coupled with the shaft, a commutator 16 coupled with the shaft, and windings 13 carried by the lamination stack and connected to the commutator. Brushes 17 engage the commutator to deliver electric current to the windings. The motor includes a frame structure 18 and permanent magnets 19 carried by the frame structure. At least one assembly is provided including a sleeve bearing 22, an elastomer structure 24 coupled with the sleeve bearing, and a retainer 26. The sleeve bearing is operatively associated with an end of the shaft to support the shaft for rotation. The elastomer structure is clamped between the frame structure and the retainer, with the retainer being engaged with a portion of the frame structure to maintain clamping on the elastomer structure. The assembly is constructed and arranged to reduce transmission of noise from the sleeve bearing to the frame structure, and to control endplay of the armature structure by controlling compression of the elastomer structure due to clamping by the retainer.

14 Claims, 3 Drawing Sheets

US 6,998,746 B2

ELECTRIC MOTOR SLEEVE BEARING ASSEMBLY WITH ACOUSTIC/VIBRATION DECOUPLING AND ENDPLAY ADJUSTMENT

This application is based on U.S. Provisional Application No. 60/489,650, filed on Jul. 24, 2003, and claims the benefit thereof for priority purposes.

FIELD OF THE INVENTION

The invention relates to a sleeve bearing assembly of an electric motor for reducing bearing noise and for adjusting endplay of an armature of the motor.

BACKGROUND OF THE INVENTION

In any rotating electrical device bearing noise is a significant contributor to the overall motor noise. In an electric motor with one or two sleeve bearings that are used for both axial thrust surfaces and cylindrical running surfaces, the bearing related noise consists of four main components:
1) Bearing/Shaft Friction Noise created by the interface of two sliding surfaces
2) Commutator Brush Noise/vibration transmitted through the commutator to the shaft to the bearing
3) Cogging Torque Noise transmitted from the cogging lamination in the magnetic circuit to the shaft to the bearing
4) Axial thrust surface noise caused by the interaction of the axial thrust washer and the bearing All of these noises associated with the bearing are amplified when considering the noise/vibration path to the adjacent structure. Bearing/structure noise is created by vibration transferred to the adjacent resonating structure. Thus, there is a need to reduce this noise while providing endplay adjustment.

SUMMARY OF THE INVENTION

An object of the invention is to fulfill the need referred to above. In accordance with the principles of the present invention, this objective is achieved by providing an electric motor including an armature structure having a shaft, a lamination stack coupled with the shaft, a commutator coupled with the shaft, and windings carried by the lamination stack and connected to the commutator. Brushes engage the commutator to deliver electric current to the windings. The motor includes a frame structure and permanent magnets carried by the frame structure. At least one assembly is provided including a sleeve bearing, an elastomer structure coupled with the sleeve bearing, and a retainer. The sleeve bearing is operatively associated with an end of the shaft to support the shaft for rotation. The elastomer structure is clamped between the frame structure and the retainer, with the retainer being engaged with a portion of the frame structure to maintain clamping on the elastomer structure. The assembly is constructed and arranged to reduce transmission of noise from the sleeve bearing to the frame structure, and to control endplay of the armature structure by controlling compression of the elastomer structure due to clamping thereof by the retainer.

In accordance with another aspect of the invention, a method of setting endplay of an armature structure of a motor is provided. The motor includes a frame structure, at least one sleeve bearing for supporting a shaft of the armature structure. The motor further includes an elastomer structure coupled with the sleeve bearing, and a retainer. The method includes the steps of holding the armature structure within the frame structure, placing the sleeve bearing, with the elastomer structure coupled thereto, onto an end of the shaft, moving the elastomer structure until it bottoms out on a portion of the frame structure, compressing the elastomer structure between the retainer and the portion of the frame structure to set a desired endplay, and ensuring that the retainer is secured with respect to the frame structure to maintain the elastomer structure in a compressed condition.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
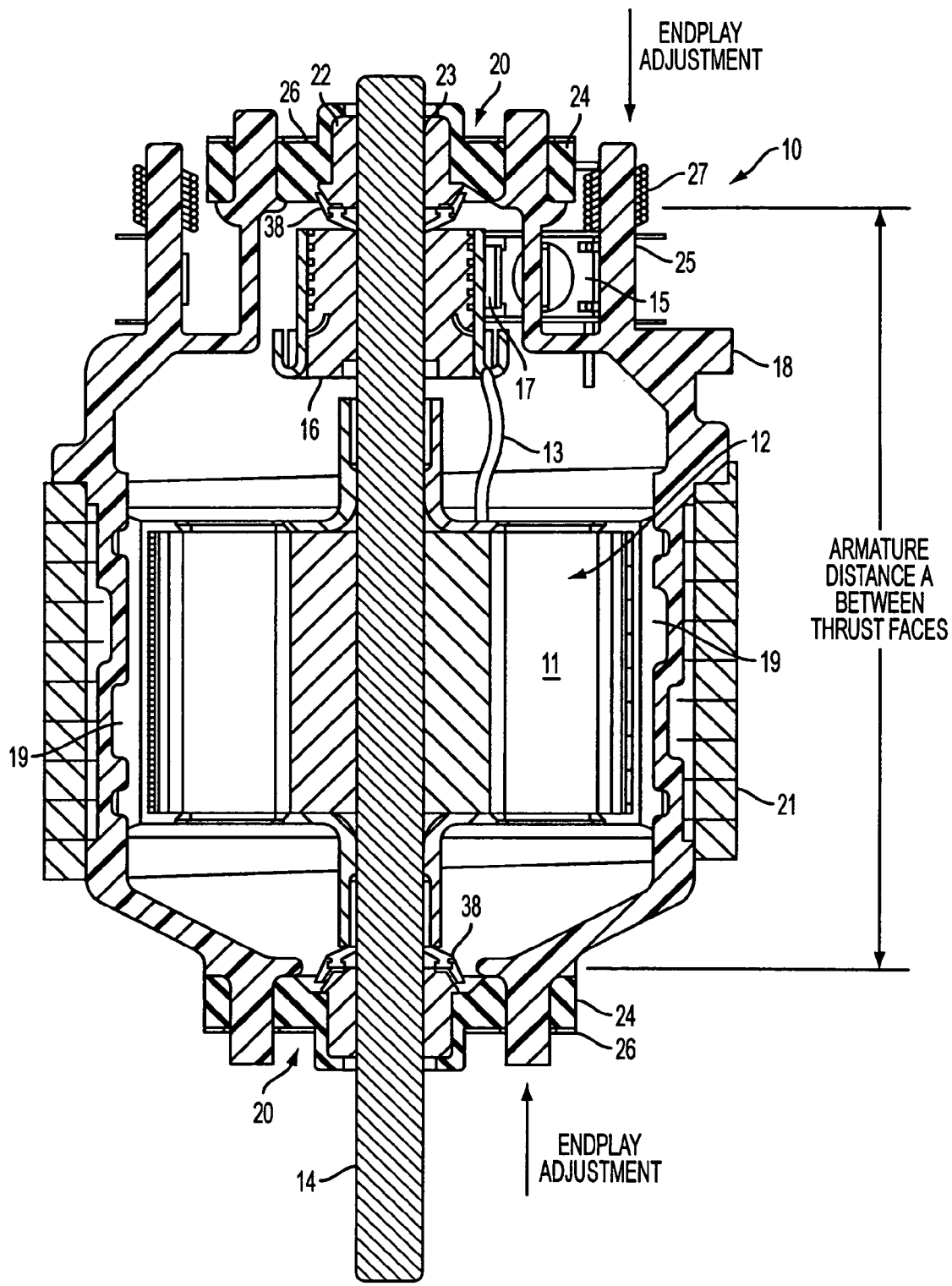
FIG. 1 is a cross-sectional view of an electric motor having sleeve bearing/elastomer assemblies in accordance with the principles of the invention for noise reduction and endplay adjustment.

With reference to FIG. 1, an electric motor is shown, generally indicated at 10, in accordance with the principles of the invention. The motor 10 is preferably configured for automotive HVAC systems. The electric motor 10 includes an armature structure, generally indicated at 12. The armature structure 12 includes a lamination stack 11 coupled to a shaft 14. The lamination stack 11 carries windings 13 (the complete set of windings is not shown in the interest of clarity of FIG. 1). The armature structure 12 also includes a commutator 16 coupled with the shaft 14. Brushes 17 engage the commutator 16 and conduct electrical current to the windings 13 which are connected to the commutator 16. Each brush 17 is carried by a brush arm 15 that is coupled to a support 25 of the frame structure 18 of the motor 10. A spring 27 biases the brush arm 15 and thus brush 17 into contact with the commutator 16. Two permanent magnets 19 are disposed adjacent to the lamination stack 11 and are carried by the frame structure 18. The frame structure 18 is preferably molded from plastic, but can be of any die-cast material or thixomolding or powder metal process. A flux member 21, in the form of a ferrous coil spring, contacts (directly or indirectly) the permanent magnets 19 to define a flux path of the motor 10.

Figure 3:
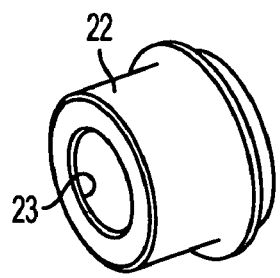
FIG. 3 is perspective view of a sleeve bearing of a sleeve bearing/elastomer assembly of the motor of FIG. 1.
Figure 4:
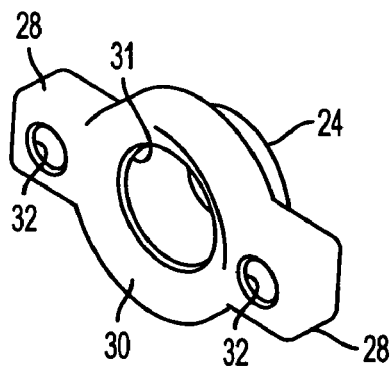
FIG. 4 is perspective view of an elastomer structure of a sleeve bearing/elastomer assembly of the motor of FIG. 1.

In the embodiment shown in FIG. 1, a sleeve bearing/elastomer assembly, generally indicated at 20, is provided at each end of the motor 10. Each sleeve bearing/elastomer assembly 20 includes a sleeve bearing 22 (FIG. 3) having a bore 23 for receiving an end of the shaft 14 to support the shaft for rotation, an elastomer structure 24 (FIG. 4) that is coupled with the sleeve bearing 22, and a retainer 26 (FIG. 5) disposed over the elastomer structure 24. The elastomer structure 24 is compressible and can be over-molded with respect to the sleeve bearing 22 or provided about the sleeve bearing 22 in a press-fit arrangement. The elastomer structure 24 includes a pair of tabs 28 extending in opposing directions from a main body 30 of the elastomer structure. Each tab 28 has a bore 32 there through that is received by an associated post 29 of the frame structure 18, as will be explained more fully below. The posts 29 extend, from a stop surface 33 defined at each end of the motor, in the axial direction of the shaft 14. The main body 30 of the elastomer structure 24 includes a central bore 31 that receives the sleeve bearing 22 when the sleeve bearing 22 is press-fitted into the bore 31.

Figure 5:
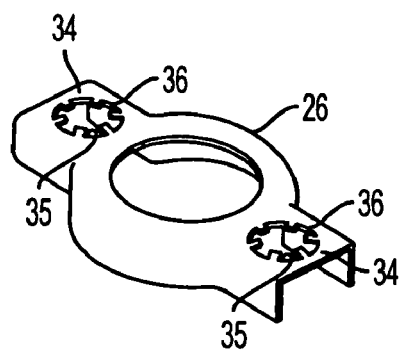
FIG. 5 is perspective view of a retainer of a sleeve bearing/elastomer assembly of the motor of FIG. 1.

As best shown in FIG. 5, the retainer 26 includes a pair of tabs 34 that cooperate with tabs 28 of the elastomer structure 24 when assembled. In addition, each tab 34 of the retainer 26 has a bore 35 there through. Integral spring barbs 36 are defined about the periphery of each bore 35.

This invention de-couples the bearing/frame structure noise utilizing three means.

1) The bearing 22 is assembled into the elastomer structure 24 by means of over-molding or press fit and the retainer 26 is placed over the elastomer structure 24. The resulting bearing/elastomer assembly 20 is placed over the posts 29 of the frame structure 18 with the shaft 14 being supported by the bearings 22. The elastomer structure 24 acts as a decoupling device to reduce the transmitted acoustic energy to the frame structure 18. Due to the inherent damping properties of the elastomer material, very little acoustic energy is transmitted to the motor frame structure 18.

2) Furthermore, as noted above, there are two tabs 28 molded into the elastomer structure 24. These tabs 28 function as the structural and positional features to locate the bearing 22 to the frame structure 18. This allows the bearing/elastomer assembly 20 to be held in an area that is not on the outside diameter of the bearing, which further decouples the bearing structural noise. The tabs 28 limit the path of noise from being amplified by the motor structure.

3) When the armature structure 12 is axially displaced within the desired endplay, the armature thrust surface contacts the bearing thrust surface and creates a "knock" sound. This bearing/elastomer assembly 20 decouples this noise and any axial thrust noise from being amplified by the motor structure.

Figure 2:
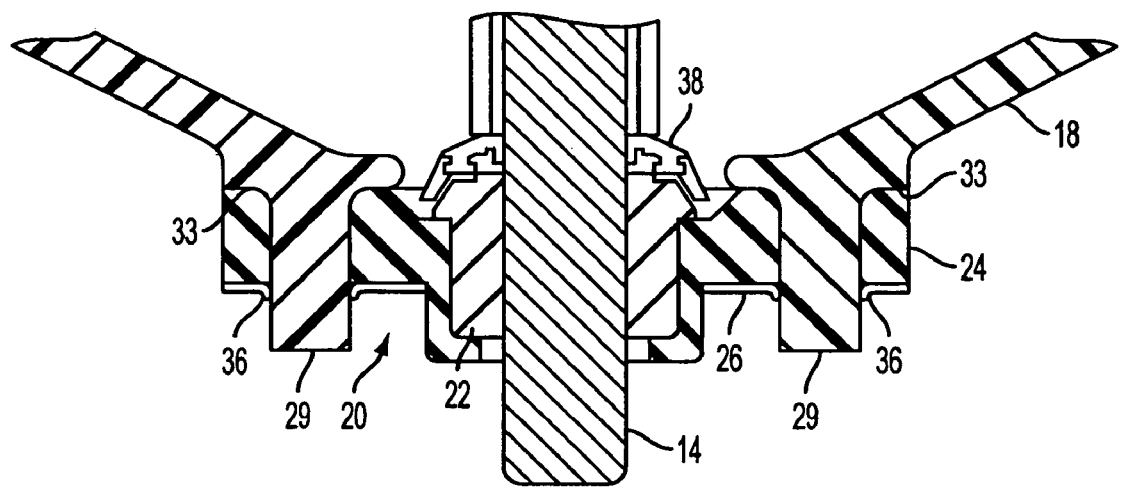
FIG. 2 is an enlarged view of the bottom portion of the motor of FIG. 1.

A second feature of the motor of the embodiment is the ability to adjust the motor endplay. Electric motors that utilize two sleeve bearings require endplay adjustment. Endplay can be defined as the axial movement of the armature structure after assembly. This is controlled by the difference in the resultant assembled dimension A (FIG. 1) between the thrust faces of the armature structure and the distance between the inner thrust surfaces of the two bearings in the stator. Endplay in HVAC motors is usually controlled from 0.1 mm to 1 mm to eliminate axial knocking sounds when the armature structure experiences axial vibration. The embodiment provides a means to set the desire armature structure endplay upon assembly of the motor. The following is a description of the sequence of steps used in setting the endplay:

1) The armature structure 12 with thrust washers 38 (FIG. 2) is held concentric to the frame structure 18 in a fixture.
2) An elastomer/bearing assembly 20 is placed onto each end of the shaft 14 of the armature structure 12.
3) Each elastomer structure 24 is moved inwardly over the posts 29 until it bottoms out on the stop surface 33 of the frame structure 18.
4) Each bearing retainer 26 with spring barbs 36 is pushed over the posts 29. The spring barb/clip feature prevents the retainer 26 from 'backing off' the posts 29. The retainer 26 is pushed down to the elastomer structure 24 and clamps and compresses the elastomer structure 24 between the retainer 26 and stop surface 33 until the desired endplay is set.

Endplay adjustment at only one end of the motor is necessary. With both ends of the motor being adjustable, the armature structure position can be adjusted in the motor as well as the endplay.

This device applies to all electric motors that utilize sleeve bearings.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. An electric motor comprising:
an armature structure including:
a shaft,
a lamination stack coupled with the shaft,
a commutator coupled with the shaft, and
windings carried by the lamination stack and connected to the commutator,
brushes engaging the commutator to deliver electric current to the windings,
a frame structure,
permanent magnets carried by the frame structure, and
at least one assembly including a sleeve bearing, an elastomer structure directly coupled with the sleeve bearing, and a retainer, the sleeve bearing being operatively associated with an end of the shaft to support the shaft for rotation, the elastomer structure being clamped between the frame structure and the retainer, with the retainer being engaged with a portion of the frame structure to maintain clamping on the elastomer structure,
the assembly being constructed and arranged to reduce transmission of noise from the sleeve bearing to the frame structure, and to control endplay of the armature structure by controlling compression of the elastomer structure due to clamping thereof by the retainer.

2. The motor of claim 1, wherein the frame structure includes a pair of posts extending from a stop surface defined at at least one end of the motor.

3. The motor of claim 2, wherein the elastomer structure includes a pair of tabs, the tabs extending in opposing directions from a main body of the elastomer structure, each tab including a bore there through receiving an associated said post.

4. The motor of claim 3, wherein the retainer includes a pair of tabs that cooperate with the tabs of the elastomer structure, each tab of the retainer including a bore there through, each bore in the retainer having spring barbs disposed about a periphery thereof, the bores of the retainer receiving an associated post with the spring barbs being constructed and arranged to secure the retainer with respect to the posts.

5. The motor of claim 1, wherein the elastomer structure includes a central bore, with the sleeve bearing being received in the central bore.

6. The motor of claim 1, wherein the frame structure is composed of plastic.

7. The motor of claim 1, wherein one assembly is operatively associated with each end of the shaft.

8. An electric motor comprising:
an armature structure including:
a shaft,
a lamination stack coupled with the shaft,
a commutator coupled with the shaft, and
windings carried by the lamination stack and connected to the commutator,
brushes engaging the commutator to deliver electric current to the windings,
a frame structure,
permanent magnets carried by the frame structure, and
a sleeve bearing at each an end of the shaft for supporting the shaft for rotation,
compressible means directly coupled with at least one of the sleeve bearings for reducing transmission of noise from the at least one of the sleeve bearings to the frame structure, and for controlling endplay of the armature structure by controlling compression of the compressible means, and
means for controlling compression of the compressible means.

9. The motor of claim 8, wherein the compressible means is an elastomer structure, and the means for controlling compression is a retainer, the elastomer structure being compressed between the frame structure and the retainer, with the retainer being engaged with a portion of the frame structure to maintain compression of the elastomer structure.

10. The motor of claim 9, wherein the frame structure includes a pair of posts extending from a stop surface defined at at least one end of the motor.

11. The motor of claim 10, wherein the elastomer structure includes a pair of tabs, the tabs extending in opposing directions from a main body of the elastomer structure, each tab including a bore there through receiving an associated said post.

12. The motor of claim 11, wherein the retainer includes a pair of tabs that cooperate with the tabs of the elastomer structure, each tab of the retainer including a bore there through, each bore in the retainer having spring barbs disposed about a periphery thereof, the bores of the retainer receiving an associated post with the spring barbs being constructed and arranged to secure the retainer with respect to the posts.

13. The motor of claim 8, wherein the compressible means is coupled with the sleeve bearing.

14. The motor of claim 8, wherein the frame structure is composed of plastic.

* * * * *